United States Patent Office 3,261,800
Patented July 19, 1966

3,261,800
BORON NITRIDE INCORPORATED IN POLYMER PRODUCTS
Oliver Dale Collins III, Wilmington, Del., assignor to E. I. du Pont de Nemours and Company, Wilmington, Del., a corporation of Delaware
No Drawing. Filed Sept. 8, 1960, Ser. No. 54,578
4 Claims. (Cl. 260—37)

This invention relates to plastic compositions. It is more particularly directed to compositions comprising a thermoplastic polymer and from 0.05% to 70% by weight of boron nitride.

It has been found that valuable and highly desirable properties can be conferred upon polymers by incorporating varying quantities of boron nitride into them. For example, by incorporating boron nitride into polymers which are commonly used to prepare molded shaped articles, the ease with which these articles are released from the molds after the application of heat and pressure is greatly enhanced.

It has also been found that polymers, particularly hydrocarbon polymers, can be made into excellent radiation and thermal-neutron shields by incorporating boron nitride into them. The effectiveness of the boron nitride-containing polymers as radiation and thermal-neutron shields is attributed to the large absorption cross-section of boron, which blocks the passage of the thermal neutrons. Boron nitride has been found to be more effective for this use than any other known boron compound.

It has also unexpectedly been found that boron nitride particles incorporated into such polymers as polyoxymethylene will function as nucleating agents for crystal growth. These particles promote the formation of many small crystalline centers, limit the growth of neighboring crystallites, and keep the formation of large massive spherulites to a minimum, thereby increasing the impact strength of the final molded article. An added advantage of the use of boron nitride as a nucleating agent is that it permits the use of colored pigments, which was not possible with nucleating agents used heretofore.

Boron nitride, when it is incorporated into polymers, imparts a pearlescent sheen to them because of the boron nitride's plate-like crystal structure. These crystals act as planar reflectors and give the plastic compositions their pearliness.

Polymers into which boron nitride can be incorporated according to this invention include polyolefins such as polyethylene, polystyrene, and polypropylene; acrylic polymers such as polyacrylates and polymethylmethacrylate; polyoxymethylene, polyamides, melamine resins, urea resins, cellulose ethers, alkyd resins, casein resins, vinyl polymers, cellulose esters, polyesters, and epoxy resins.

Boron nitride acts especially well as a nucleating agent in polyoxymethylene and is an excellent pearlescent pigment and mold release agent in acrylic and polyolefin polymers.

Any kind of boron nitride can be used in the compositions of this invention. When the boron nitride is incorporated into a polymer to improve its mold release characteristics, or when boron nitride is used as a pearlescent pigment, it is preferable to use a boron nitride whose crystal size is as large as possible. Such a boron nitride is preferred for these uses because lubricity and pearlescence are functions of crystal size, and larger crystals, of course, are more effective. A boron nitride having large crystals and which is especially suited for these purposes is described in U.S. application Serial No. 6173.

Boron nitride can be incorporated into polymers for the foregoing purposes in concentrations of from .1% to 70%, without exudation of boron nitride from the final product. The amount of boron nitride to be incorporated will naturally depend upon the use to which the product is put and upon the particular polymer used; the precise amount to be used in any particular application will be apparent to one skilled in the art. Generally, however, to promote mold release, the boron nitride will be incorporated into the polymers at concentrations of from .1% to 20%, by weight. When the polymers are to be used as neutron shields, boron nitride should be incorporated at a concentration of from 0.1% to 30%. When boron nitride is used as a nucleating agent, it should be incorporated in the polymer at a concentration of from .05% to 10%. When used as a pearlescent pigment, boron nitride can be incorporated in concentrations up to 70% by weight; however, concentrations of more than 1% to 2% render the final product increasingly opaque.

In addition to the boron nitride, the plastic compositions of this invention can also contain conventional additives as fillers, dyes, antioxidants, and materials which increase their tensile strength.

The boron nitride can be incorporated into the polymer by any of the techniques known in the art, such as milling or extrusion, or it can be added to the monomer before complete polymerization.

The compositions of this invention can be used to replace part or all of the plastics commonly used to fabricate molded articles. They can be molded or extruded into any shape or form desired.

This invention will be more readily understood and more easily practiced by referring to the following illustrative examples:

*Example 1*

Fifty parts by weight of commercial polyethylene are worked between chrome-plated mill rolls heated to a temperature of 160° C. until the polyethylene becomes a dough-like mass. One-half part by weight of boron nitride is then added to this mass and the mass is worked to disperse the boron nitride. The polyethylene is then rolled into a sheet and allowed to cool.

This sheet is white, with a pearlescent sheen. The boron nitride does not exude from the surface.

The polyethylene formed in this way can be used as a thermal neutron shield, either as a sheet, or as shreds enclosed within a space.

*Example 2*

One hundred parts by weight of commercial styrene polymer are milled for five minutes with one-half part of boron nitride on a roll mill heated to 160° C. The boron nitride is thus uniformly dispersed in the polymer. The material is then molded into a plate at 160° C. and at a pressure of 625 pounds per square inch. The plate is easily removed from the mold and exhibits a strong pearlescence.

*Example 3*

Boron nitride is incorporated into commercial polyoxymethylene, using the same proportions and the same techniques as in Example 2. The resulting material is rolled into a sheet and allowed to cool slowly. Crystal size in this sheet, as observed microscopically, is very small, indicating excellent nucleation. The impact resistance of the sheet is high.

*Example 4*

Boron nitride is incorporated into a commercial methacrylate polymer in the proportion of .5 part boron nitride to 100 parts of polymer. The technique used is identical to that used in Example 2. The resulting material has a pearlescent sheen and releases easily from the mold.

The embodiments of the invention in which an exclusive property or privilege is claimed are:

1. A composition comprising polyoxymethylene and from .05% to 10% by weight of boron nitride.

2. A method for protecting an environment from neutron radiation, said method comprising interposing between the source of said radiation and said environment a shield comprising polyoxymethylene and from 0.1% to 30%, by weight, of boron nitride.

3. A method of nucleating crystal growth in polyoxymethylene, said method comprising incorporating into said polyoxymethylene from .05% to 10%, by weight, of boron nitride.

4. A method of nucleating crystal growth in polyoxymethylene, said method comprising incorporating into said polyoxymethylene prior to molding thereof from 0.5% to 10% by weight of boron nitride, and molding said boron nitride containing polyoxymethylene into a molded article.

References Cited by the Examiner

UNITED STATES PATENTS

| | | | |
|---|---|---|---|
| 2,162,178 | 6/1939 | Marasco et al. | 204—154.36 |
| 2,593,300 | 4/1952 | Hachmuth | 260—707 |
| 2,603,667 | 7/1952 | Pankratz | 260—707 |
| 2,768,994 | 10/1956 | MacDonald | 260—67 |
| 2,796,411 | 6/1957 | Zirkle et al. | 204—193.36 |
| 2,796,529 | 6/1957 | Morrison | 204—193.36 |
| 2,858,451 | 10/1958 | Silversher | 204—154.36 |
| 2,871,216 | 1/1959 | Anderson | 260—41.5 |
| 2,902,460 | 9/1959 | Jennings et al. | 260—41 |
| 2,951,821 | 9/1960 | Kesling | 260—41 |
| 2,961,415 | 11/1960 | Axelrad | 204—193.36 |
| 2,971,908 | 2/1961 | Chaffin | 260—41 X |
| 2,981,773 | 4/1961 | Weedman | 260—707 |
| 3,114,733 | 12/1963 | Hopff et al. | 260—67 |
| 3,133,887 | 5/1964 | Alliegro et al. | 252—478 |
| 3,153,636 | 10/1964 | Shanta et al. | 252—478 |

FOREIGN PATENTS 546,816   10/1956   Belgium.

OTHER REFERENCES

American Ceramic Society, Bulletin 36, March 1957, pages 109–111.

The Reactor Handbook, vol. 3, 1955, pages 522 and 523.

Rockwell: Reactor Shielding Design Manual, 1956, pages 175–177.

WILLIAM H. SHORT, *Primary Examiner.*

LEON D. ROSDOL, OSCAR R. VERTIZ, *Examiners.*

R. C. LYNE, R. L. GOLDBERG, L. M. MILLER,
    *Assistant Examiners.*